April 12, 1955 — F. R. DUERR — 2,705,851

MOLD FOR FUSION-CASTING OF REFRACTORY OXIDE COMPOSITIONS

Filed Sept. 19, 1952

INVENTOR.
FRANCIS R. DUERR
BY Rolf E. Schneider
ATTORNEY.

United States Patent Office 2,705,851
Patented Apr. 12, 1955

2,705,851

MOLD FOR FUSION-CASTING OF REFRACTORY OXIDE COMPOSITIONS

Francis R. Duerr, Levittown, N. Y., assignor to Corhart Refractories Company, Louisville, Ky., a corporation of Delaware Application September 19, 1952, Serial No. 310,441

3 Claims. (Cl. 49—65)

This invention relates to the fusion-casting of molten refractory oxide compositions and is particularly concerned with an improved arrangement for forming a plurality of blocks or bricks from such a molten composition in a single pour.

Refractory oxide compositions such as those disclosed in Field 2,271,366 or Magri 2,599,566 are customarily melted in an electric furnace lined with refractory material of the same composition in order to avoid contamination of the melt, which itself is covered with an excess of the batch. Under these conditions the maximum temperature employed cannot be substantially above the melting point of the particular composition being processed. For this reason and also because of the relatively poor thermal conductivity of such refractory oxide compositions compared to that of metals, the melt cannot be handled in a ladle as are molten metals without freezing a substantial layer thereof against the wall of the ladle. It is therefore customary to cast such molten refractory oxide compositions directly from the furnace into individual molds formed by arranging into the desired shape suitably cut slabs produced by mixing silica sand with an organic binder and baking or heating the same. In order to minimize the cavity or pipe which is normally formed in such a casting due to crystallization shrinkage of the liquid refractory on cooling, a compensating or make-up amount of molten refractory oxide composition is provided in a reservoir or font positioned above the gate hole of the mold.

As the size of the casting becomes smaller, the time required to make a multiplicity of such castings from a single melt is materially increased, with the result that the time the furnace is available for melting is correspondingly decreased. Since substantially the same time is spent in bringing up and taking away a mold for a 10 lb. block as one for a 1000 lb. block, this time factor is of considerable economic significance.

It would be desirable therefore to be able to fill a plurality of such small size molds by a single pouring, as in the case of a molten metal cast at a temperature well above its melting point into a central container from which it flows through branching narrow channels to a plurality of adjacent small molds. However, it is not possible to properly fill a plurality of molds in such manner with a molten refractory oxide composition because of the rapidity with which the liquid refractory, heated only slightly above its melting point, freezes and closes the necessarily narrow channels. Moreover, if several molds are closely superposed with intercommunicating gate holes to minimize the distance of flow, such gate holes have to be made much larger than would be required for a molten metal in order to prevent their premature clogging with quickly chilled spattered molten refractory or particles of incompletely fused refractory. Even under these conditions, however, the utilization of such a gang mold formed of the usual baked sand construction has not proved successful because, while the lower castings are unusually solid, the upper castings have such abnormally large shrinkage cavities that they are unusable.

I have now discovered that the above-described difficulties can be avoided and a plurality of small castings of a refractory oxide composition can be made successfully in a single pouring in a plurality of superposed intercommunicating molds or compartments provided that the partition separating each pair of the adjacent compartments is composed of graphite, that such partition is at least ¼ inch thick, and that the opening therein is at least ¾ inch in diameter.

For a better understanding of the invention and its utility, reference is had to the accompanying drawing in which.

Figure 3:
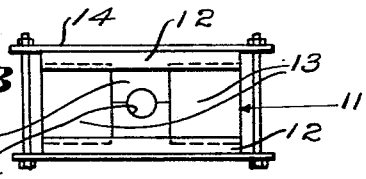
Fig. 3 is a top plan view of the mold as viewed in Fig. 2.
Figure 1:
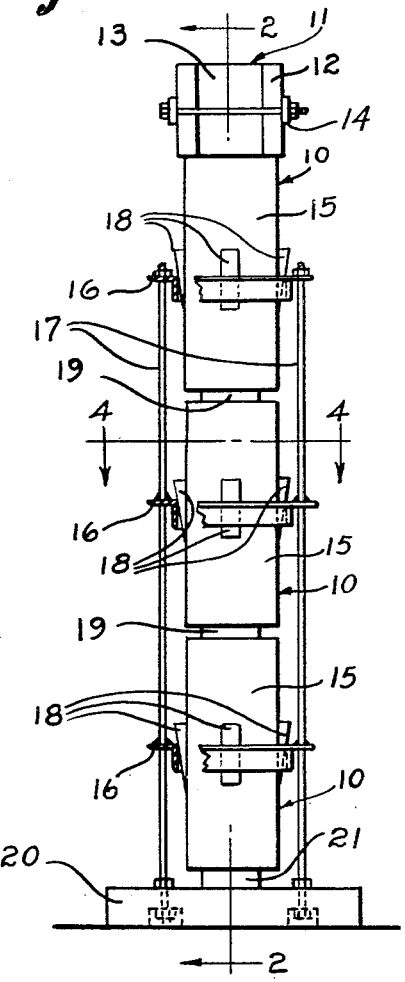
Fig. 1 is a side view of a gang mold according to my invention.
Figure 2:
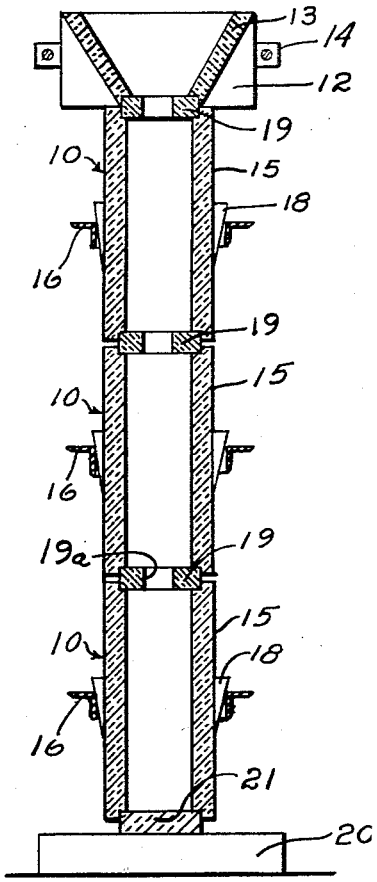
Fig. 2 is a vertical section of such mold taken along the line 2—2 of Fig. 1.

As shown in the drawing the gang mold is composed of a plurality of vertically arranged intercommunicating compartments 10, the uppermost of which is in communication with a font 11 comprising side walls 12, mortised end walls 13 and a retaining metal framework 14. The compartments 10 have enclosing side walls 15 held together in each case by means of angle iron clamps 16, mounted on metal rods 17, and refractory wedges 18. Gated partitions 19 composed of graphite are mortised into the side walls 15 above each compartment. The entire assembly is mounted on a metal base 20, the lowermost compartment resting on a graphite plate 21 forming the bottom thereof.

In the utilization of such mold, a refractory oxide composition such as any of those disclosed in Field 2,271,366 or Magri 2,599,566 is melted in an electric furnace in the conventional manner. The resulting molten material at a temperature somewhat above its melting point is poured into the font 11, from which it passes into the several compartments 10, until the compartments and the font are full. The filled gang mold is thereafter placed in a sheet metal container and covered with an insulating powder such as infusorial earth and allowed to anneal in the conventional manner.

The advantage of the present invention is that it permits the production of castings having substantially normal shrinkage pipes at each level of the gang mold as compared with the objectionably large pipes which are characteristic of the upper series of castings formed in prior gang molds containing baked sand partitions. Such improvement results primarily from the use of graphite, which has an appreciably higher thermal conductivity than the conventional baked sand molding composition, for the partitions 19.

On account of its higher thermal conductivity, graphite is more effective than the baked sand in conducting away a substantial proportion of the latent heat of crystallization of the molten refractory material in each mold or compartment in the neighborhood of the partitions 19, whereby freezing of the material in each gate hole 19a and a closing off thereof can be effected before the extra liquid in the font 11 has been exhausted by the preliminary crystallization shrinkage. At this stage, as will be readily apparent, each casting consists of a solidified shell and a liquid interior, and pipe formation can begin only after further solidification shrinkage. Since no further drainage from one compartment to another can occur with the gate holes frozen off, however, each casting develops its own pipe just as though it had been cast individually.

Figure 4:
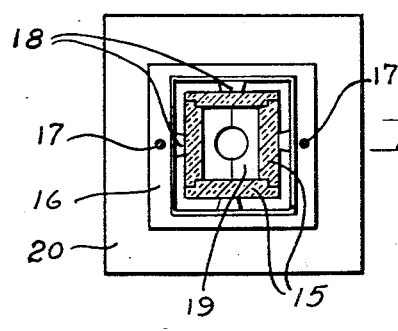
Fig. 4 is a horizontal section on the line 4—4 of Fig. 1.

To obtain such satisfactory results, the partitions 19 should be at least ¼ inch thick; and the gate hole or opening 19a therein, which may be of practically any desired shape but is preferably round and located in the center of the partition, should be at least ¾ inch in diameter, the hole in the uppermost partition advantageously being larger than the others. Since graphite in thin sections is somewhat brittle, I prefer to make the partitions 19 one inch or more thick, in which case the gate hole 19a should be increased to 1¼ inches or more, as explained hereinafter, to further diminish any likelihood of occasional clogging by frozen or unmelted refractory material. In order to facilitate its subsequent removal from a finished casting when cold, each partition is divided, preferably through its center, as shown in Fig. 4.

If desired, the partitions 19, instead of being mortised within the side walls 15, may extend outwardly and be flush with the outer surfaces of the side walls. Such construction is advantageous if the side walls themselves are composed of the conventional baked sand rather than graphite, and will facilitate the conduction of heat from and effect the freezing of the molten refractory oxide material within the gate holes within the desired interval after pouring. For best results, however, the side walls of the compartments should also be made of graphite, preferably about 1¼ inches thick for the smaller size castings.

The minimum gate hole size of ¾ inch diameter is set by the ability to fill all the superposed molds without danger of premature clogging of gate holes 19a; and a larger opening may have to be used if the partitions 19 are substantially more than the minimum thickness. Since the heat capacity of the graphite partitions also contributes to chilling of the castings, the graphite may be raised to so high a temperature, if such chilling is insufficient, that it will burn in the liquid refractory and cause undesirable gas porosity in the castings. Partitions of ¼ inch thickness have been found to be the minimum practical for use with the above compositions, thicker partitions being required for compositions that are easily reduced.

In general, then, above these lower limits if a thicker partition is used as for greater strength, the gate hole diameter should desirably be also increased to eliminate any tendency toward premature clogging by spattered and quickly frozen liquid. For a given thickness of partition and a given molten refractory, the optimum gate hole size which can be frozen off prior to complete drainage of the font 11 can readily be determined by trial. Because of the difficulty of working a refractory oxide composition, however, it is undesirable to have the interconnecting sprues too large in comparison in cross-section to the castings because of the difficulty in subsequently severing them from the castings.

Although the invention has been described in connection with a gang mold comprising three superposed compartments, its use is limited only by the increasing unwieldiness and height as the number of superposed compartments is increased. The number of compartments may conveniently be increased, however, by arranging them so that their largest cross-section is horizontal.

What is claimed is:

1. A gang mold for casting molten refractory oxide compositions, which comprises at least three superposed inter-communicating compartments, each pair of adjacent compartments having one wall in common forming the top of one and the bottom of the other of said compartments, said common wall being composed of graphite at least ¼ inch thick and having an opening at least ¾ inch in diameter but less than the cross-section of the compartments forming the communication between said compartments, the opening in each said common wall being such in size that it is closed by solidification of the molten refractory oxide therein after filling of the mold but before substantial drainage of molten refractory oxide therethrough takes place due to shrinkage incidental to solidification of the refractory oxide in the several compartments.

2. A gang mold for casting molten refractory oxide compositions, which comprises at least three superposed inter-communicating compartments, each pair of adjacent compartments having one wall in common forming the top of one and the bottom of the other of said compartments, said common wall being composed of graphite at least ¼ inch thick and having an opening at least ¾ inch in diameter but less than the cross-section of the compartments forming the communication between said compartments, a font positioned above and in communication with the uppermost of said compartments, and a partition between said font and said uppermost compartment composed of graphite at least ¼ inch thick and having an opening larger than ¾ inch in diameter but less than the cross-section of such compartment forming the communication between the font and the uppermost compartment, the opening in each said common wall and the opening in said partition being such in size that they are closed by solidification of the molten refractory oxide therein after filling of the compartments and font but before substantially complete drainage of molten refractory oxide from the font occurs due to shrinkage incidental to solidification of the refractory oxide in the several compartments.

3. A gang mold as in claim 2 in which the sidewalls of each compartment are also composed of graphite.

References Cited in the file of this patent

UNITED STATES PATENTS

| | | |
|---|---|---|
| 241,758 | Tranter et al. | May 17, 1881 |
| 388,336 | Boulton | Aug. 21, 1888 |
| 1,700,288 | Fulcher | Jan. 29, 1929 |
| 2,164,635 | Benner et al. | July 4, 1939 |
| 2,241,386 | Benner et al. | May 13, 1941 |
| 2,334,929 | Hone | Nov. 23, 1943 |